United States Patent Office 3,341,511
Patented Sept. 12, 1967

3,341,511
PROCESS FOR PRODUCING NITROSOCYCLO-
HEXANE DIMER
Ikuzo Tanaka and Tokuji Sakai, Hino-shi, Tokyo, Japan,
assignors to Teijin Limited, Osaka, Japan, a corporation of Japan
No Drawing. Filed Dec. 3, 1964, Ser. No. 415,815
Claims priority, application Japan, Jan. 31, 1964,
39/4,490; Nov. 17, 1964, 39/64,885
4 Claims. (Cl. 260—143)

ABSTRACT OF THE DISCLOSURE

A process for producing nitrosocyclohexane dimer which comprises the steps of pyrolyzing in the presence of nitrogen monoxide at least one cyclohexylcarbinol nitrous acid ester at a temperature of 250° C.–600° C. under a pressure of from 0.5 to 0.002 atmosphere.

This invention relates to a new process for producing nitrosocyclohexane dimer. More particularly, the invention relates to a process for producing nitrosocyclohexane dimer by the pyrolysis of the carbinol nitrous acid esters having a cyclohexyl radical, which is represented by the formula

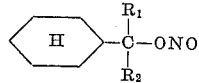

wherein

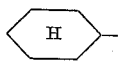

is the cyclohexyl radical and $R_1$ and $R_2$ are hydrogen or a primary alkyl radical having 1–4 carbon atoms and may be the same or different. For convenience' sake, the starting material in the present invention, as represented by the foregoing formula, will be hereinafter referred to as cyclohexylcarbinol nitrous acid esters. The nitrosocyclohexane dimer is readily rearranged to cyclohexanone oxime by heating and, in turn, this can be made into ε-caprolactam by the Beckmann rearrangement reaction. Hence, the nitrosocyclohexane dimer is an important intermediate for the production of ε-caprolactam, which forms polycaprolactam on polymerisation.

The nitrosocyclohexane dimer has been synthesized in the past by various processes. For example, as processes for its production, known are such as the oxidation of cyclohexylamine, the oxidation of cyclohexylhydroxylamine and the photochemical reaction of cyclohexane and nitrosyl chloride.

The present invention, however, differing entirely from these conventional processes as to its form of reaction, is a new process for the production of the nitrosocyclohexane dimer.

According to the invention process, the aldehydes or ketones can be formed besides the intended nitrosocyclohexane dimer.

This invention is directed to a process for producing the nitrosocyclohexane dimer by the pyrolysis of the cyclohexylcarbinol nitrous acid esters having the formula

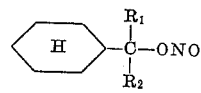

wherein

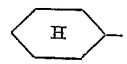

is a cyclohexyl radical, and $R_1$ and $R_2$ are hydrogen or a primary alkyl radical of 1–4 carbon atoms, which may be the same or different.

It is presumed that the pyrolytic reaction of the cyclohexylcarbinol nitrous acid esters proceeds in the following scheme in this invention.

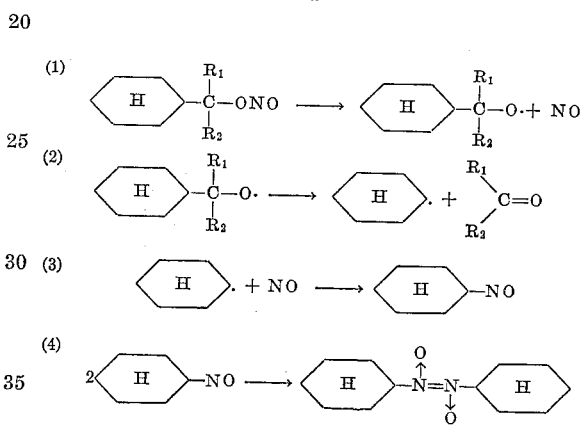

Thus, it is believed that the cyclohexyl radical formed in the decomposition of alkoxy-radical (2) bonds with NO formed in the primary decomposition (1) to become nitrosocyclohexane by reaction (3), which subsequently can be transformed into the nitrosocyclohexane dimer by reaction (4). That the products obtained by the thermal decomposition are the nitrosocyclohexane dimer and aldehydes or ketones is explained by the reactions (1) to (4). In the invention reaction, a small amount of nitrogen monoxide and cyclohexylcarbinol are also obtained. The cyclohexylcarbinol obtained as a by-product can be recovered and made into cyclohexylcarbinol nitrous acid esters to be then used again as the starting material by recycling to the system.

As the starting material substance to be used in the invention, any of the cyclohexylcarbinol nitrous acid esters of the formula

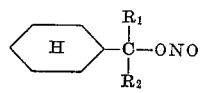

wherein

$R_1$, and $R_2$ are as previously indicated, can be used. Included are, for example, such as the cyclohexylcarbinol nitrous acid esters; the cyclohexylmonoalkylcarbinol nitrous acid esters such as cyclohexylmonomethylcarbinol nitrous acid ester, cyclohexylmonoethylcarbinol nitrous acid ester, cyclohexylmono-n-propylcarbinol nitrous acid ester and cyclohexylmono-n-butylcarbinol nitrous acid ester; and the cyclohexyldialkylcarbinol nitrous acid esters such as cyclohexyldimethylcarbinol nitrous acid ester, cyclohexyldiethylcarbinol nitrous acid ester, cyclohexyldi-n-propylcarbinol nitrous acid ester, cyclohexylmethylethylcarbinol nitrous acid ester, cyclohexylethyl n-propyl carbinol nitrous acid ester and cyclohexyl n-propyl n-butylcarbinol nitrous acid ester.

The invention process can be carried out at a reaction temperature of 200–1000° C., and preferably 250–600° C., and a reaction tube entrance pressure of 1–0.001 atmosphere, and preferably 0.5–0.002 atmosphere.

Although the contact time of the starting material, i.e., the dwell time in the system, of 0.01–500 seconds or even more will do, normally a time of 0.05–200 seconds is preferred. The contact time should be chosen in consideration of various factors to ensure that the pyrolytic reaction is carried out suitably.

The invention reaction must be carried out under at least an inert atmosphere. An inert atmosphere, as used herein, refers to one in which there is not present in the reaction system a substance which will either oxidize the starting material used in the invention or capture the cyclohexyl radicals formed under the reaction conditions of the present invention. For rendering the atmosphere of the reaction system of the invention inert, this can be accomplished by replacing the air in the reaction system preliminarily with an inert diluent such as nitrogen or carbon dioxide.

It is preferred to carry out the invention reaction in the presence of nitrogen monoxide, as it is possible to enhance the selectivity of the intended nitrosocyclohexane dimer. As is apparent from the hereinbefore given Equation 3, nitrogen monoxide is a substance which acts as a reactant in the present invention. The NO radicals are formed in the reaction system according to this invention by the thermal decomposition of the starting material cyclohexycarbinol nitrous acid ester. Aside from this however, by effecting the reaction in the presence of nitrogen monoxide, the NO radicals become excessive and, as a result, the reaction proceeds smoothly to enhance the selectivity of the intended nitrosocyclohexane dimer.

Further, according to the invention, the pyrolytic reaction can be carried out by diluting the starting material nitrous acid esters and/or the foregoing nitrogen monoxide with the aforementioned inert diluents. In this case, the nitrous acid ester to be fed and nitrogen monoxide may be diluted in advance with said inert diluent and then fed to the reaction system. The diluent may, of course, also be introduced into the reaction system intermittently or continuously during the reaction. When using the nitrogen monoxide and/or inert diluent in this invention in this manner, their proportion is preferably within the following range:

$$\frac{\text{Number of moles of nitrogen monoxide}}{\text{Number of moles of the starting material cyclohexylcarbinol nitrous acid ester}} = 0.2\text{--}50$$

$$\frac{\text{Number of moles of the inert diluent}}{\text{Number of moles of the starting material cyclohexylcarbinol nitrous acid ester}} = 0.1\text{--}50$$

When the reaction is carried out by diluting with an inert diluent in this manner, the reaction can be readily controlled and hence is desirable.

Further, according to the present invention, the inert organic solvents can be used as the aforementioned inert diluent. It is possible to raise the selectivity of the intended nitrosocyclohexane dimer markedly by carrying out the reaction particularly in the presence of nitrogen monoxide and an inert organic solvent. As such inert organic solvents, included are, for example, the aliphatic compounds such as methane and ethane; the alicyclic compounds such as cyclohexane and cyclopentane; and the aromatic compounds such as benzene, toluene and chlorobenzene. The inert organic solvents are preferably used in the following proportion:

$$\frac{\text{Number of moles of the inert organic solvent}}{\text{Number of moles of the starting material cyclohexylcarbinol nitrous acid ester}} = 0.1\text{--}10.0$$

In addition, when, of the aforementioned starting material having the formula

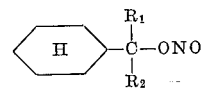

wherein

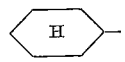

$R_1$ and $R_2$ are as hereinbefore indicated, one is used in the invention in which at least one of either $R_1$ or $R_2$ is especially an alkyl radical having 1–4 carbon atoms, the selectivity of the intended nitrosoyclohexane dimer is enhanced.

Thus, a much greater enhancement in the selectivity of the resulting dimer can be had in this invention by suitably combining the hereinbefore mentioned desirable conditions.

Since the pyrolytic reaction of the cyclohexylcarbinol nitrous acid esters in this invention is an endothermic reaction, desirably used for the reaction tube is one having the best possible heat exchange rate, preferably being either glass or quartz, or the use of a metallic or ceramic packing, or a reaction tube which contains a plate-shaped heat exchanger.

In general, the cyclohexylcarbinol nitrous acid esters are unstable to heat and light, and since they tend to decompose to alkoxy radicals, it is preferred that preventive measures be taken to ensure that the foregoing nitrous acid esters are not exposed to such conditions prior to the reaction.

Further, since the formed nitrosocyclohexane dimer easily reacts with the cyclohexylcarbinol nitrous acid esters, it is preferred that the two be promptly separated after the invention reaction.

For a still clearer understanding of the invention, the following examples are given, it being understood that these examples are for illustrating the invention and not in limitation thereof.

*Examples 1–9*

When the cyclohexylcarbinol nitrous acid esters indicated in column 2 of the following Table I were pyrolyzed by introducing the same in their gaseous state into pyrolytic reaction tubes having the temperatures shown in column 4 and reaction tube entrance pressures shown in column 6 for the contact times indicated in column 5 under the flow of substances shown in column 3, white crystals were obtained in each instance. The white crystals were severally recrystallized from cyclohexane to obtain crystals having the melting points severally of 113.5–115.5° C. (literature value 116–116.5° C.). It was confirmed from infrared absorption sepectra that they were nitrosocyclohexane dimer: $\nu_{N-O}$, 1200 cm.$^{-1}$ (VS).

The rates of conversion and selectivity are shown in columns 7 and 8, respectively.

TABLE I

| Example | Starting Material | Substance Added (mole ratio based on starting material) | Reaction Conditions ||| Conversion, percent | Selectivity, percent |
| --- | --- | --- | --- | --- | --- | --- | --- |
|  |  |  | Temp., °C. | Contact Time, sec. | Pressure, mm. Hg |  |  |
| 1 | Cyclohexanemethanol nitrous acid ester. | None | 370 | 26.0 | 2.0 | 59.7 | 33.9 |
| 2 | ____do____ | Nitrogen monoxide (12.2) | 370 | 129 | 8 | 88.2 | 75.2 |
| 3 | ____do____ | Nitrogen monoxide (1.9) plus cyclohexane (0.687). | 370 | 0.16 | 7 | 63.5 | 81.6 |
| 4 | Cyclohexylmethylcarbinol nitrous acid ester. | None | 370 | 26.0 | 7 | 57.0 | 45.8 |
| 5 | ____do____ | Nitrogen monoxide (5.0) | 350 | 4.94 | 14 | 61.7 | 87.0 |
| 6 | ____do____ | Nitrogen monoxide (2.0) plus cyclohexane (0.731). | 380 | 0.13 | 6 | 53.0 | 90.0 |
| 7 | Cyclohexyldimethylcarbinol nitrous acid ester. | None | 370 | 26 | 7 | 82.1 | 44.7 |
| 8 | ____do____ | Nitrogen monoxide (2.6) | 380 | 0.13 | 7 | 92.2 | 82.5 |
| 9 | ____do____ | Nitrogen monoxide (2.6) plus cyclohexane (0.814). | 380 | 0.13 | 7 | 72.0 | 84.0 |

It is apparent from the foregoing results, that an improvement is had in the selectivity when the cyclohexylmethylcarbinol or cyclohexyldimethylcarbinol nitrous acid ester having the methyl or dimethyl substituent is used as the starting material instead of cyclohexanemethanol nitrous acid ester. This can be seen by comparison of Examples 1, 4 and 7. Further, as is apparent by a comparison of Examples 1, 4 and 7 with Examples 2, 5 and 8 it can be seen that a marked enhancement of the selectivity is had when nitrogen monoxide is present as compared with the instances of its absence; and further that a still further improvement in the selectivity is had by the conjoint use of an inert organic solvent with the nitrogen monoxide, as shown by Examples 3, 6 and 9. Thus, it is seen that it is desirable in this invention to carry out the pyrolysis using, as the starting material, an alkyl-substituted, and particularly a methyl-substituted, cyclohexylcarbinol nitrous acid ester, in the presence of nitrogen monoxide (and an inert organic solvent), since the selectivity of the nitrosocyclohexane dimer is enhanced.

*Examples 10–13*

The reactions were carried out following the procedures as described in Examples 1–9, varying the R of the formula

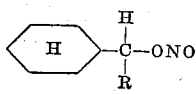

with methyl, ethyl, propyl and butyl, with the results shown in Table II.

*Examples 14–17*

Pyrolyses were carried out as in Examples 1–9, varying the $R_1$ and $R_2$ of the formula

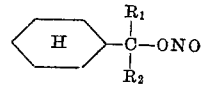

with alkyl radicals having 1–4 carbon atoms, as indicated in the following Table III. The results obtained are shown in said table.

TABLE III

| Ex. | Starting Material || Reaction Conditions |||| Conversion, percent | Selectivity, percent |
| --- | --- | --- | --- | --- | --- | --- | --- | --- |
|  | $R_1$ | $R_2$ | Pressure, mm. Hg | Temperature, °C. | Contact Time, sec. | NO (mole)/ material (mole) |  |  |
| 14 | CH₃— | CH₃— | 6.0 | 310 | 12.5 | 1.4 | 29.3 | 88.0 |
| 15 | CH₃— | C₂H₅— | 3.0 | 350 | 6.5 | 6.7 | 73.7 | 87.7 |
| 16 | C₂H₅— | C₂H₅— | 12.1 | 363 | 2.05 | 5.8 | 92.2 | 82.5 |
| 17 | C₃H₇— | C₄H₉— | 9.0 | 400 | 5.5 | 2.4 | 71.0 | 85.2 |

*Examples 18–21*

Methane, chlorobenzene, cyclopentane and benzene were used as the inert organic solvent, and in the case of methane, the same procedures as described in Examples 1–9 were followed, whereas in the case of chlorobenzene, cyclopentane and benzene, the starting material dissolved in these solvents was introduced into the reaction tube in a gaseous state; otherwise the reactions

TABLE II

| Example | Starting Material | Reaction Conditions |||| Conversion, percent | Selectivity, percent |
| --- | --- | --- | --- | --- | --- | --- | --- |
|  |  | Pressure, mm. Hg | Temperature, °C. | Contact Time, sec. | NO (mole)/ material (mole) |  |  |
| 10 | Cyclohexylmethylcarbinol nitrous acid ester | 24.0 | 330 | 1.86 | 1.4 | 29.7 | 90.0 |
| 11 | Cyclohexylethylcarbinol nitrous acid ester | 28.0 | 350 | 9.5 | 1.56 | 50.9 | 82.3 |
| 12 | Cyclohexylpropylcarbinol nitrous acid ester | 14.0 | 350 | 7.3 | 5.0 | 61.7 | 87.0 |
| 13 | Cyclohexylbutylcarbinol nitrous acid ester | 48 | 370 | 16.1 | 2.4 | 47.8 | 75.6 | were carried out as in Examples 1–9. The results obtained are shown in Table IV.

TABLE IV

| Ex. | Starting Material | Inert Organic Solvent | Reaction Conditions | | | | | | Conversion, percent | Selectivity, percent |
|---|---|---|---|---|---|---|---|---|---|---|
| | | | Pressure, mm. Hg | Temperature, °C | Contact Time, sec. | NO (mole) / Material (mole) | Inert Organic Solvent (mole) / Material (mole) | N₂ (mole) / Material (mole) | | |
| 18 | Cyclohexanemethanol nitrous acid ester. | Methane | 6.5 | 370 | 0.061 | 0.822 | 0.698 | | 28.6 | 73.1 |
| 19 | ....do.... | Chlorobenzene | 14 | 350 | 0.7 | 2.4 | 0.81 | 16.8 | 30.5 | 71.8 |
| 20 | Cyclohexylmethylcarbinol nitrous acid ester. | Cyclopentane | 4.5 | 370 | 0.0774 | 0.67 | 0.54 | | 49.3 | 90.8 |
| 21 | ....do.... | Benzene | 6 | 370 | 0.17 | 2.6 | 1.43 | | 43.5 | 85.0 |

*Examples 22–28*

The nitrosocyclohexane dimer was obtained by operating as in Examples 1–9 while using the starting materials indicated in column 2 of the following Table V and varying the conditions diversely as indicated therein. The conversion and selectivity rates thereby obtained are shown in the same Table V.

TABLE V

| Ex. | Starting Material | Temperature, °C | Pressure, mm. Hg | Contact Time, sec. | NO (mole) / Material (mole) | Inert Gas (mole) / Material (mole) | Inert Organic Solvent (mole) / Material (mole) | Conversion, percent | Selectivity, percent |
|---|---|---|---|---|---|---|---|---|---|
| 22 | Celoheyxylmethylcarbinol nitrous acid ester. | 200 | 760 | 360 | | Helium 50 | | 95.7 | 19.7 |
| 23 | ....do.... | 350 | 14 | 7.3 | 5.0 | | | 61.7 | 87.0 |
| 24 | Cyclohexyldimethylcarbinol nitrous acid ester. | 370 | 3 | 372 | 1.98 | | | 88 | 76.2 |
| 25 | Cyclohexylmethylcarbinol nitrous acid ester. | 370 | 16.5 | 69 | | Nitrogen 18.3 | | 66 | 48.3 |
| 26 | Cyclohexylpropylbutylcarbinol nitrous acid ester. | 400 | 9 | 5.5 | 2.4 | | | 71 | 85.2 |
| 27 | Cyclohexylmethylcarbinol nitrous acid ester. | 450 | 2 | 85 | 2.93 | | | 79.7 | 85.1 |
| 28 | ....do.... | 550 | 5 | 0.614 | 2.5 | | Cyclohexane 2.04 | 91.5 | 80.1 |

What is claimed is:

1. A process for producing nitrosocyclohexane dimer which comprises pyrolyzing in the presence of nitrogen monoxide at least one cyclohexylcarbinol nitrous acid ester represented by the formula

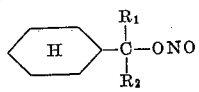

wherein

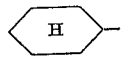

is a cyclohexyl radical, $R_1$ and $R_2$ are members selected from the group consisting of hydrogen and the alkyl radicals having one to four carbon atoms wherein $R_1$ and $R_2$ may be the same or different radicals, at a temperature of 250° C.–600° C. under a reduced pressure of from 0.5 to 0.002 atmospheres.

2. A process according to claim 1 wherein said pyrolysis is effected in the presence of an inert organic solvent.

3. A process for producing nitrosocyclohexane dimer which comprises pyrolyzing in the presence of nitrogen monoxide at least one cyclohexylcarbinol nitrous acid ester represented by the formula

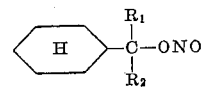

wherein $\langle H \rangle -$ is a cyclohexyl radical, $R_1$ and $R_2$ are members selected from the group consisting of hydrogen and the alkyl radicals having one to four carbon atoms wherein $R_1$ and $R_2$ may be the same or different radicals but when either $R_1$ or $R_2$ is hydrogen, the other is an alkyl radical having one to four carbonations, at a temperature of 250° C.–600° C. under a reduced pressure of from 0.5 to 0.002 atmospheres.

4. A process according to claim 3 wherein said pyrolysis is effected in the presence of an inert organic solvent.

References Cited

Gowenlock et al., J. Chem. Soc. (London), Volume of 1956, pp. 1670–1675.

CHARLES B. PARKER, *Primary Examiner.*

F. D. HIGEL, *Assistant Examiner.*